(12) United States Patent
Doshi et al.

(10) Patent No.: US 11,818,106 B2
(45) Date of Patent: *Nov. 14, 2023

(54) AI MODEL AND DATA TRANSFORMING TECHNIQUES FOR CLOUD EDGE

(71) Applicant: Intel Corporation, Santa Clara, CA (US)

(72) Inventors: Kshitij Arun Doshi, Tempe, AZ (US); Francesc Guim Bernat, Barcelona (ES); Suraj Prabhakaran, Aachen (DE)

(73) Assignee: Intel Corporation, Santa Clara, CA (US)

(*) Notice: Subject to any disclaimer, the term of this patent is extended or adjusted under 35 U.S.C. 154(b) by 68 days.

This patent is subject to a terminal disclaimer.

(21) Appl. No.: 17/403,549

(22) Filed: Aug. 16, 2021

(65) Prior Publication Data
US 2022/0038437 A1    Feb. 3, 2022

Related U.S. Application Data

(63) Continuation of application No. 15/941,724, filed on Mar. 30, 2018, now Pat. No. 11,095,618.

(51) Int. Cl.
*H04L 9/40* (2022.01)
*G06N 3/08* (2023.01)
(Continued)

(52) U.S. Cl.
CPC .......... *H04L 63/0428* (2013.01); *G06F 21/14* (2013.01); *G06F 21/6245* (2013.01);
(Continued)

(58) Field of Classification Search
CPC ..... H04L 63/0428; H04L 67/10; G06F 21/14; G06F 21/6245; G06N 3/0454; G06N 3/08; G06N 3/04; H04W 12/02; G05N 5/04
See application file for complete search history.

(56) References Cited

U.S. PATENT DOCUMENTS 11,095,618 B2   8/2021  Doshi et al.
2012/0254333 A1* 10/2012  Chandramouli ........ G06F 40/10
                                                 709/206
(Continued)

FOREIGN PATENT DOCUMENTS

CN         110322012        10/2019

OTHER PUBLICATIONS

"European Application Serial No. 19159849.9, Response filed Dec. 14, 2021 to Communication Pursuant to Article 94(3) EPC dated Aug. 4, 2021", 16 pgs.

(Continued)

*Primary Examiner* — Khoi V Le
(74) *Attorney, Agent, or Firm* — Schwegman Lundberg & Woessner, P.A.

(57) ABSTRACT

Systems and techniques for AI model and data camouflaging techniques for cloud edge are described herein. In an example, a neural network transformation system is adapted to receive, from a client, camouflaged input data, the camouflaged input data resulting from application of a first encoding transformation to raw input data. The neural network transformation system may be further adapted to use the camouflaged input data as input to a neural network model, the neural network model created using a training data set created by applying the first encoding transformation on training data. The neural network transformation system may be further adapted to receive a result from the neural network model and transmit output data to the client, the output data based on the result.

30 Claims, 8 Drawing Sheets

(51) Int. Cl.
  *G06F 21/14* (2013.01)
  *G06F 21/62* (2013.01)
  *H04W 12/02* (2009.01)
  *H04L 67/10* (2022.01)
  *G06N 3/045* (2023.01)
  *G06N 3/04* (2023.01)

(52) U.S. Cl.
  CPC .............. *G06N 3/045* (2023.01); *G06N 3/08* (2013.01); *H04L 67/10* (2013.01); *H04W 12/02* (2013.01); *G06N 3/04* (2013.01)

(56) References Cited

U.S. PATENT DOCUMENTS

| | | | | |
|---|---|---|---|---|
| 2014/0081989 | A1* | 3/2014 | Chang | H04L 67/10 707/748 |
| 2017/0078501 | A1* | 3/2017 | Chang | G06F 3/1248 |
| 2017/0155655 | A1* | 6/2017 | Spaulding | H04L 9/3226 |
| 2017/0350676 | A1* | 12/2017 | Bender | G06F 3/1438 |
| 2018/0013730 | A1* | 1/2018 | Ling | H04L 63/06 |
| 2018/0234510 | A1* | 8/2018 | Sharma | G06F 16/285 |
| 2019/0044918 | A1 | 2/2019 | Doshi et al. | |
| 2019/0266758 | A1* | 8/2019 | Turner | G06T 11/60 |

OTHER PUBLICATIONS

"European Application Serial No. 19159849.9, Extended European Search Report dated Jul. 29, 2019", 7 pgs.
"European Application Serial No. 19159849.9, Response filed Apr. 1, 2020 to Extended European Search Report dated Jul. 29, 2019", 15 pgs.
"U.S. Appl. No. 15/941,724, Non Final Office Action dated Apr. 16, 2020", 11 pgs.
"U.S. Appl. No. 15/941,724, Response filed Jul. 16, 2020 to Non Final Office Action dated Apr. 16, 2020", 10 pgs.
"U.S. Appl. No. 15/941,724, Final Office Action dated Oct. 29, 2020", 12 pgs.
"U.S. Appl. No. 15/941,724, Response filed Jan. 29, 2021 to Final Office Action dated Oct. 29, 2020", 11 pgs.
"U.S. Appl. No. 15/941,724, Notice of Allowance dated Apr. 15, 2021", 20 pgs.
"European Application Serial No. 19159849.9, Communication Pursuant to Article 94(3) EPC dated Aug. 4, 2021", 6 pgs.
Keke, Chen, "Geometric data perturbation for privacy preserving outsourced data mining", Knowledge and Information Systems ; An International Journal, Springer-Verlag, LO, vol. 29, No. 3, (Nov. 23, 2010), 39 pgs.
Liu, Li, "The applicability of the perturbation based privacy preserving data mining for real-world data", Data and Knowledge Engineering, Elsevier BV, NL, vol. 65, No. 1, (Feb. 26, 2008), 17 pgs.
Mohammad, Al-Rubaie, "Privacy Preserving Machine Learning: Threats and Solutions", arxiv.org, Cornell University Library, 201 Olin Library Cornell University Ithaca, NY 14853, (Mar. 27, 2018), 18 pgs.
Mynavathi, R, "K nearest neighbor classifier over secured perturbed data", 2016 World Conference on Futuristic Trends in Research and Innovation for Social Welfare (Startup Conclave), IEEE, (Feb. 29, 2016), 4 pgs.
U.S. Appl. No. 15/941,724 U.S. Pat. No. 11,095,618, filed Mar. 30, 2018, AI Model and Data Transforming Techniques for Cloud Edge.

* cited by examiner

AI MODEL AND DATA TRANSFORMING TECHNIQUES FOR CLOUD EDGE

This application is a continuation of U.S. application Ser. No. 15/941,724, filed Mar. 30, 2018, which is incorporated herein by reference in its entirety.

TECHNICAL FIELD

Embodiments described herein generally relate to communicating data to telecommunication service providers and cloud service providers of edge infrastructures and, in some embodiments, more specifically to camouflaging the neural network model.

BACKGROUND

The Internet of Things (IoT) refers to the connected network of devices, appliances, vehicles, and other electronic components that have embedded software, sensors, and network connectivity capabilities. IoT devices may collect data from their sensors and relay the data to other systems to process the data. For example, an IoT thermometer may communicate the temperature data to a system, but it is the system that determines if the heater should be turned on. For some IoT devices, such as in vehicles, the speed of communication with the IoT device may be essential. However, the security of the data being transmitted may also be a concern.

In modern network applications there is often a division of responsibilities for the network points between the client and the end-point system. Cloud processing may be powerful, but processing for a client is much more resource restrained and less powerful. To achieve low latency and a powerful cloud, edge computing has emerged as a means to achieve this. Edge computing is processing certain things on edge devices that tend to be more powerful than the client but less powerful than the cloud, but offer a compromise in latency.

Based on cost, flexibility, and business agility, edge infrastructures may be frequently expected to be shared among parties that may be unrelated, particularly in function as a service (FaaS) and micro services federation models. Often the edge cloud may be used to trigger these services on demand, and variations of these services may be active for short periods of time, during which latency of operations becomes a critical consideration.

As the use of deep learning (DL) for training and inference continues to grow in edge infrastructures, which may include machine-to-machine (M2M) communications, protecting the information, including the trained models, that travels between mobile devices and edge cloud based training and inference resources becomes vital.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
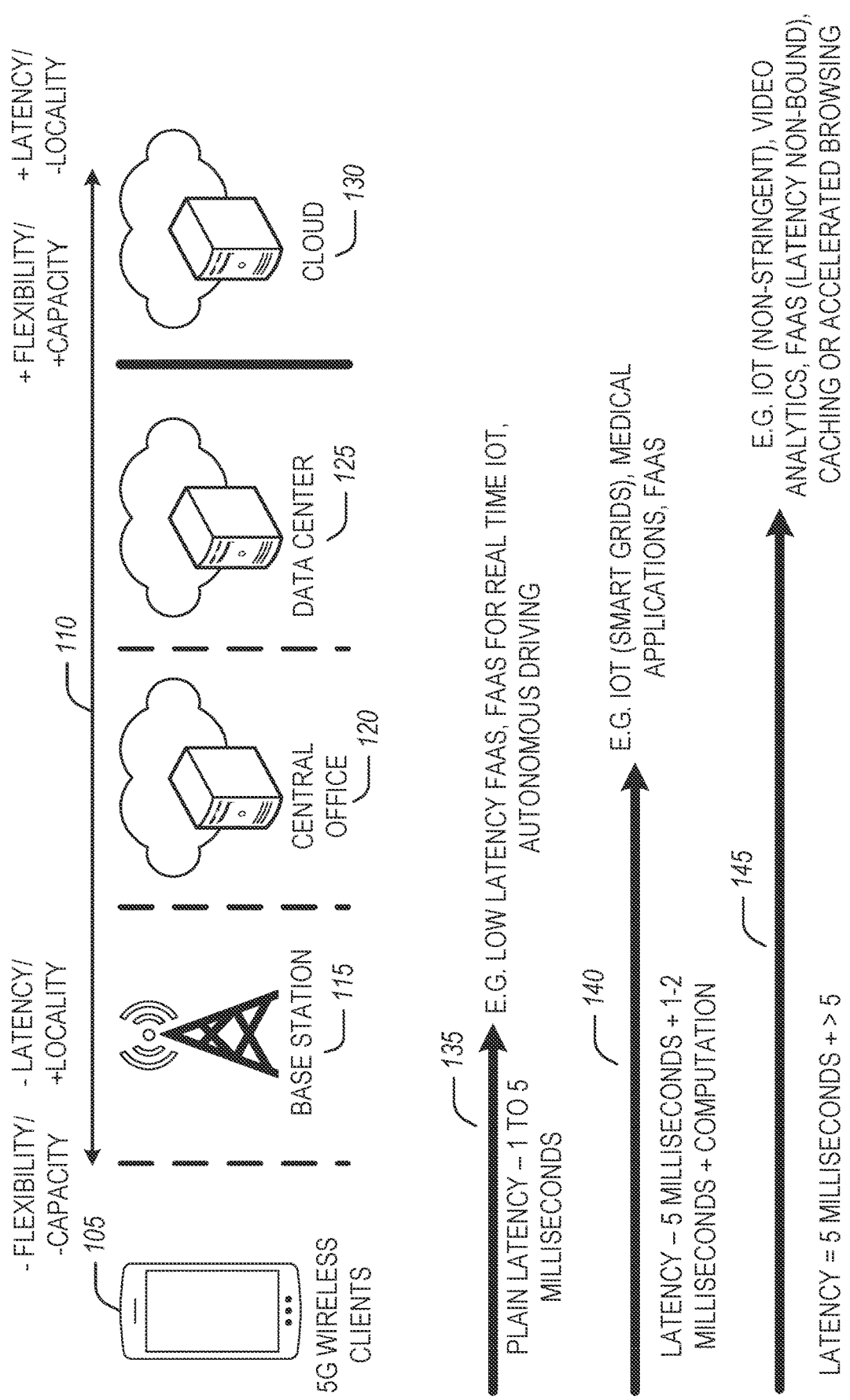
FIG. 1 illustrates an environment in which a client is connecting to one or more of a base station, central office, a data center, the cloud, or some other remote server, in accordance with some embodiments.

A concern for both cloud service providers (CSP) and end clients is to ensure the artificial intelligence (AI) models that are trained, the inferences that are drawn, and the data that is sent into shared edge infrastructures, are not exposed to eavesdropping and intellectual property (IP) theft. All providers of edge infrastructures may not be fully trusted and privacy protection laws differ considerably from one jurisdiction to another, thus the concern may extend to both the CSPs (of edge infrastructure) or to the telecommunication service providers (TSP) that provide the channels. As the market value of data and models grows, and because the models incorporate the intellectual property (IP) that the model was trained with, the efficiency with which protection from IP/data theft is obtained is essential for a frictionless and agile AI-usage economy at the edge.

A secure channel may be used for end-to-end (E2E) secure infrastructure on the edge to potentially protect against leaks of data, including the training data, inference results, and trained models. However, secure channels may involve heavy lifting on the edge architecture design, as well as assuming that all the edge cloud architectures are E2E secured, which may not be possible in all situations.

Edge cloud architectures may have security and data privacy concerns, which may be addressed as an E2E transport integrity question. Thus, practices to ensure integrity may use conventional, secure channels (e.g., transport layer security (TLS)) for protecting against information loss from client to server (and vice versa) and that servers in edge cloud architectures are themselves trusted on preventing leakage. These protection needs may implicitly include memory, pooled memory (for example, by using multi-key total-memory-encryption (MK-TME)), any external device connected to the central processing units (CPU) (e.g., any field programmable gate arrays (FPGA) running inferencing), and the links connected from the CPU. Security practices are not specific for AI and may be implemented generally for all needs.

The amount of time and computational overhead to establish a secure channel is an issue with using secure channels for internet of things (IoT) and edge computing. In many instances, a prior connection may not exist, thus a secure channel may need to be established. Additionally, with mobile IoT devices, it may be the first time the device is connecting to a particular service, and thus the discovery and negotiation of a secure channel may have time, computation, and power costs. Edge computing clients may specify a fast connection for an acceptable user experience and power efficiency. At the same time, the service may need to operate under a cloak of privacy and security.

Fog and edge computing involve pushing the AI and processing capabilities closer to the data source, such as the sensors collecting data. For example, with fog computing, the AI is pushed to the local area network level of the network architecture, such as processing the data in a fog node or an IoT gateway. With edge computing, the AI, processing, and communication may be pushed even closer to the data source, with each device playing a role in processing of information. Thus, to perform the training and inferencing of raw sensor data with an AI model, the raw sensor data from a client device may be sent over the network. The inferenced or classified data from the AI model, may be communicated back to the client device. Henceforth, the terms inferenced data from an AI model, results from an AI model, and classified data from an AI model may be used interchangeably.

Implementations and methodologies for securing end-to-end machine learning data, including the training data, inference results, and trained models, include challenges such as a substantial amount of computational resources in the data center architecture and specific hardware platform specifications that may not suit or may not be applicable to all types of edge cloud architectures.

Issues may exist with latency-sensitive usages, such as highly mobile (e.g., location and object tracking) or fast changing (e.g., event triggered) edge usages, if intermittent connections between client devices and varying edge computers request repeated measures to establish and reset privacy and IP-loss measures.

Besides the latency and resource usage burdens of security implementations, these implementations may have considerable burdens on hardware and software to realign boundaries of trust among different domains within the edge server infrastructure, based on principles of least privileged and discretionary access control, otherwise a leak in any part of the cloud edge services infrastructure may compromise all of it.

To solve the issues noted above, the data may be camouflaged before being transmitted to the network node with the AI model. The AI model is trained on camouflaged data by applying a particular transformation to camouflage the data at the client device before being transmitted. The AT model may provide camouflaged output data, with a reverse transformation applied to the output data to get back to a raw original result (such as, a classification or an inference) data useful to the client device. This provides numerous advantages including not having to use a secure (i.e., an encrypted) channel that reduces resource utilization at the edge and client device, being robust against snooping, and not requiring any different processing by the AI model, as well as no known increase in latency. Additional details and examples are described below.

The presently disclosed system and methods use a key property of machine learning, particularly for neural networks like deep neural networks (DNN) and convolutional neural networks (CNN), such that stolen IP or data may be useless. Thus if stolen IP and data is useless, the need for establishing a secure channel may be eliminated, which in turn removes the computational costs, particularly the latency, for establishing a secure channel. The presently disclosed system may reduce the necessity for expensive trust arrangements and overheads between users and CSPs/TSPs. The key property is the statistical nature of relationships between inputs and outputs of a machine learning model that are comprehended through training into the model parameters. This may make it possible to use intentional statistical noise and scrambling, among the inputs to hide (or camouflage) the model without encrypting either the model or the data sent to and from it.

The presently disclosed system and method provides protection against misuse and protection against reverse engineering. For example, protection against misuse may be theft of data either travelling to or from a client. An interloper may steal the data and use it for themselves to potentially generate their own neural network model. For example, protection against reverse engineering may be an unscrupulous consumer of the service, in other words, an entity that may legitimately use the service, but provides customized data to attempt to reverse engineer the functionality of the service.

Neural networks, such as DNNs and CNNs, may be trained or programmed by input data. The training may extract features, provided those features are not distorted (i.e., when the input data is transformed such that the relative magnitudes of the input data's multi-dimensional vectors are preserved). Similarly, the training, given sufficient data, may be capable of filtering out noise. Thus, noisy "fake" dimensions may be added to the input data such that the original input data (in the actual dimensions before the addition) is left unaffected and the fake input data is given sufficient variation that the training parameters may automatically adjust to remove the impact of the fake input, data on the outputs.

The disclosed system and methods take advantage of the robust nature of a deep learning training. The robust, nature of neural network models allows for them to be insensitive to rotations and translations of the input. With the addition of noise to the inputs and outputs, and permutation of the input's dimensions, the real and contrived input and output is obfuscated to an interloper.

For example, a neural network may be trained to classify a two-dimensional input (x, y) into an output z, such that $z=F_M(x, y)$, where $F_M$ represents a trained neural network model, M. The systems and methods described herein expand on this by training an alternative neural network N that adds noise to the input training of the neural network, as well as the output. Alternative neural network N may be trained that uses additional inputs $\underline{a}$, $\underline{b}$, and $\underline{c}$, which are drawn out of uniform distributions. While training N, fake outputs $\underline{u}$ and $\underline{v}$ are added to the actual output z. The training may change the order of the inputs, such that each input is provided as a vector $[\underline{c}, \underline{y}, \underline{a}, \underline{b}, x]$, and similarly the same may be applied to the output as vector $[\underline{v}, z, \underline{u}]$ ($\underline{a}$, $\underline{b}$, $\underline{c}$, $\underline{u}$, and $\underline{v}$ are noise that may be purposely introduced in training). Thus the altered training may have a new transfer function $G_N$, such that $[\underline{v}, z, \underline{u}]=G_N[\underline{c}, y, \underline{a}, \underline{b}, x]$. The trainer of the model knows which inputs are real and the order the real inputs are provided to $G_N$ as well as which outputs are real and their location in the output vector. Accordingly, the trainer also knows which inputs are fake and thus are silently turned into "0" during inference as well as which outputs are fake and thus silently ignored when drawing inference.

An external observer that attempts to steal the model would need to know these transformations in order to use the model. Additionally, the external observer may have to perform many experiments (including permute the inputs then watching and interpreting the outputs) to possibly determine what the correct transformations are for the model. Essentially, the external observer would need to do the same work that goes into training a model itself.

To increase the security of the described alternative neural network N, instead of using fake inputs, randomization may be used to exponentially increase the input and output spaces. Thus, for an external observer to discover $F_M$ buried inside $G_N$ it is exponentially more difficult than to directly train their own $F_M$.

Should an external observer steal the data to train their own model, there are still unknowns the external observer would have to overcome in order to replicate the model. The additional noise inputs a̲, b̲, c̲, u̲, and v̲, and their order would still be unknown. Thus, the external observer would have to know the relation between [(x, y), (z)] and [(c̲, y, a̲, b̲, x), (v̲, z, u̲)]. The stolen data may be useless without knowing the model inputs and outputs, and the stolen model is useless without knowing the relationship between actual data and observed inputs and outputs. The described system uses the statistical nature of model training to reduce the need to protect data and models using computationally expensive encrypted channels.

The described transformation system may be made further robust against reverse engineering as the inputs (x, y) are changed. During training, inputs (x, y) are scaled up and down, such that their domains overlap and a small amount of noise is added to each in training. The length of training may be extended so that the resulting camouflage model achieves the desired accuracy. This may make it more difficult for an external observer to use heuristics to deduce from a train of observations of the 5-dimensional input vector in the above example, which input is x and which input is y.

The described transformation system may protect the owner of a model from the model's IP being stolen and used by a third party, who is not a client of the owner. The described transformation system may protect the owner of a model from a client that may attempt to reverse engineer the model as the client is the owner of the inference inputs and of the outputs it receives from the model owner. The described transformation system provides for a client device to implement a secure transmission of the sensor data to the responsive system, without the use of unnecessarily burdensome encryption of communication channels.

FIG. 1 illustrates an environment in which a client, for example a 5G Wireless client 105 is connecting to one or more of a base station 115, central office 120, a data center 125, the cloud 130, or some other remote server, in accordance with some embodiments. The remote server may have an AI apparatus, such as a neural network to process client sensor data. FIG. 1 illustrates examples of the latency associated with different depths of network traversal with different use cases and acceptable user experiences.

The expanse 110 illustrates the positives and negatives for connecting to various services for requested functionality. Functionality that may have plain latency 135 of 1 to 5 ms, may include, for example, low latency FaaS, FaaS for real time IoT, or autonomous driving. Functionality that may have increased latency 140 of 5 ms+1-2 ms (100-200 kms)+computations, may include, for example, smart grid IoT, medical applications, or FaaS. Functionality that may have extended latency 145 of 5 ms+>5 ms (400-500 kms)+ computations, may include, for example, non-stringent IoT, video analytics, non-bound latency FaaS, or caching and accelerated browsing.

Figure 2:
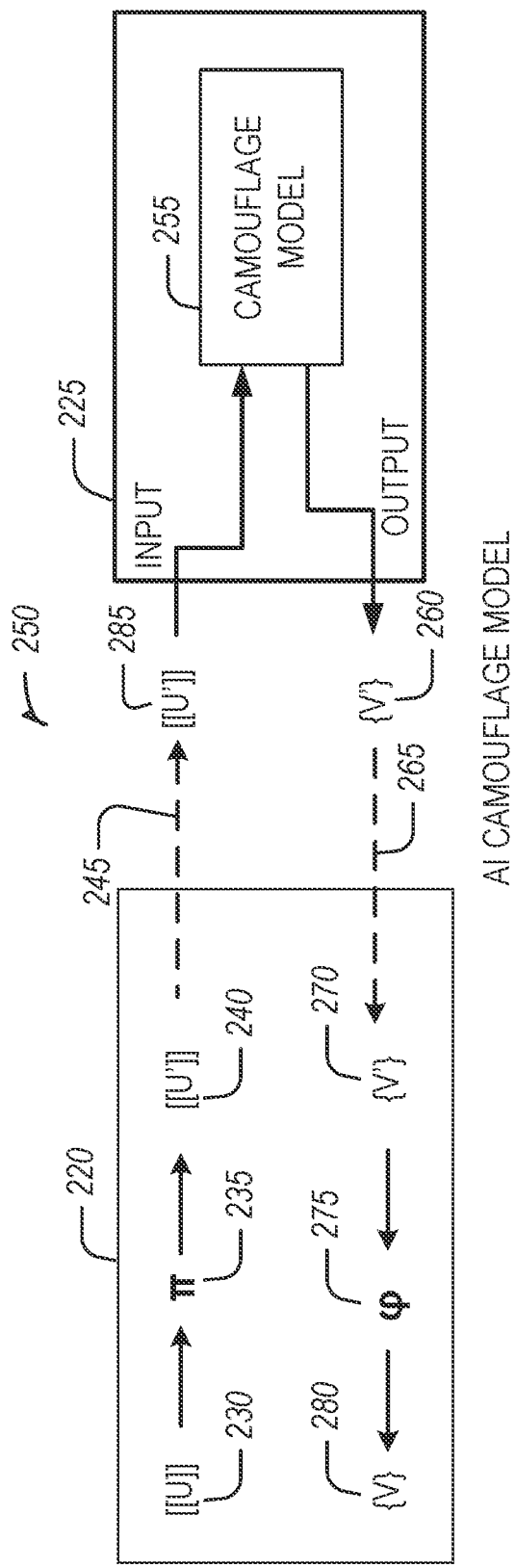
FIG. 2 illustrates an example of a system using a camouflaged artificial intelligence model, in accordance with some embodiments.

FIG. 2 illustrates an example of a system 250 using a camouflaged AI model 255, in accordance with some embodiments. The camouflaged model 255 may be trained with a transformed variation of the original inputs (U) 230 and outputs (V) 280. The transformed variation of the inputs 230 and outputs 280 may include mixed-in random-draws on fake N inputs and fake K outputs, depending on the shapes and dimensions for the input and output of the camouflaged model 255. For example, the input may be a two-dimensional input of (x, y). The transformation may include changing the input dimension to six and including four fake input values, where the fake input value may be randomly generated from a distribution. The order of the real and fake values may be mixed as well. The transformation may include performing rotations and scaling to the input values. Thus, the transformed variation of the input may be (a̲, b̲, y, c̲, x, d̲), where a̲, b̲, c̲, and d̲ are fake input values. Should the data be intercepted, it would be unknown which values are fake and what order the fake and real values fall into.

The camouflaged model 255 owner may provide to each client application 220 a client-side transformation software that may provide the forward transformation π 235 and the result-recovery transformation φ 275. The client device may generate input 230, such as data collected from sensors of shape n. The transformation π 235 transforms the data $[[U]]_n$ to distorted input 240 $[[U']]_{n+N}$. The client application 220 may transmit the distorted input 240 to a service provider 225, where the camouflaged model 255 is located. The transmission 245 may be externally observable such that the model input 285 is visible when using an unsecure channel, where model input. 285 is one iteration of distorted input 240. The camouflaged model 255 is trained with model input 285 and produces model output 260. An external observer may see U' and V', but may not derive how to use the camouflage model 255 without having access to the transformation software for π and φ. Thus, the camouflaged model 255 may be trained with transformed inputs U' to output V'. The camouflaged model 255 is an example of a model where only the owner may know the complex and noised transformation. The service provider 225 may transmit the distorted output 270 to the client application 220, where model output 260 is one iteration of distorted output 270. The transmission 265 may be externally observable such that the model output 260 is visible when using an unsecure channel. The client application 220 receives the distorted output 270, and with transformation φ 275 transforms the distorted output 270 into output 280, which is usable by the client device and client application 220.

For example, an application for a mobile device is provided by a service provider. The application collects data, such as from sensors of the mobile device, to send as input to the camouflaged model at the service provider. The transformations are embedded within the application. The application transforms the data, thus masking the data from interceptions when transmitted on an unsecured channel. As the service provider created the application, with the embedded transformation, the input data is appropriately transformed for reception by the model at the service provider. Similarly, the output data received by the application on the mobile device from the model at the service provider may be transformed into usable data for the application and mobile device by the embedded transformation. The service provider may apply the same transformations in training the model, and thus the trained model may not be useful without possessing processes of transformations 235 and 275. If it was possible for someone to learn transformations 235 and 275, it may not be possible to reverse-engineer the training itself without first producing the entire training set.

Figure 3:
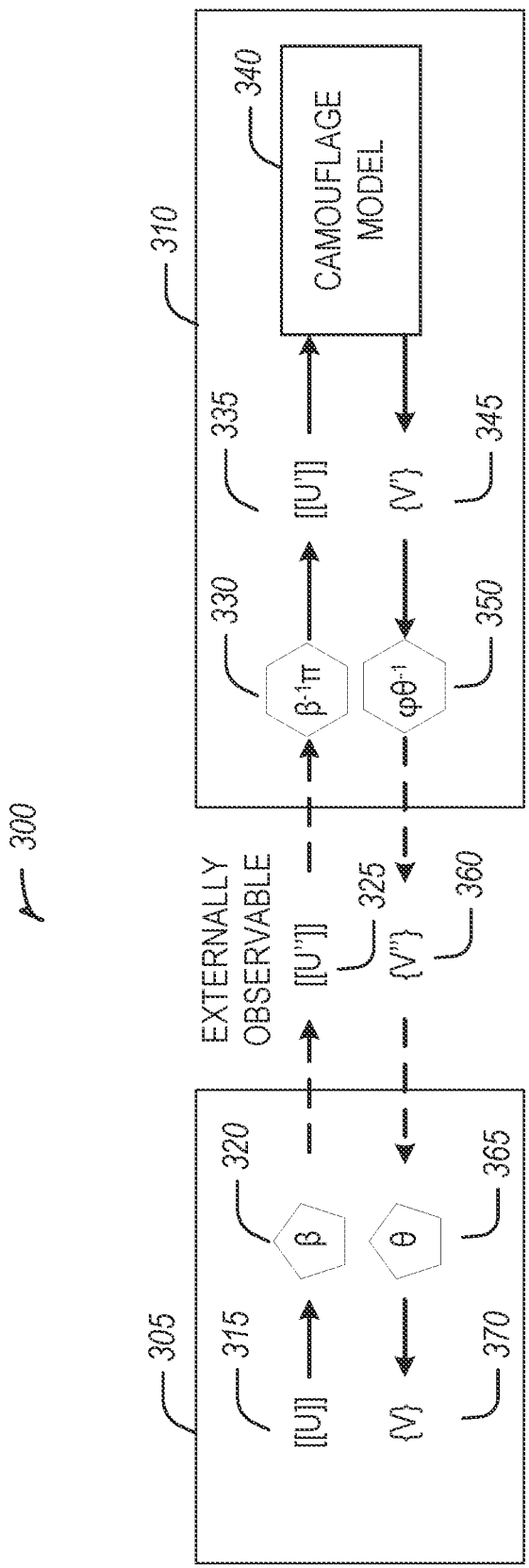
FIG. 3 illustrates an example camouflaged artificial intelligence model system with both client-side and server-side transformations, in accordance with some embodiments.

FIG. 3 illustrates an example camouflaged AI model system 300 with both client-side and server-side transformations, in accordance with some embodiments. This example system 300 applies the transformation principles at the client and service provider such that the server-side transformations, with camouflage model inputs and outputs may be opaque even to the clients of the model. In system 300, transformations to the inputs and outputs on the server side may be used. The inputs $[[U]]_n$ 315, produced by the client, may be transformed to $[[U']]_{n+N}$ 335 along its path to the camouflaged model 340. The model is referred to as a camouflaged model 340 as it is not a model that accepts actual training and inference data, such as input data U, which may be sensor data from a device. Instead, the camouflaged model is trained using the transformed input, and thus for training or inference, needs transformed input data. Hence it is camouflaged, such that if un-transformed data was provided as an input, the camouflaged model output would not be an untransformed output and thus hiding the functionality of the model from someone that might gain access to the camouflaged model.

A first transformation β 320 at the client 305 transforms the input 315 to shape $[[U'']]_{n+M}$ 325 that may be specific to a client. Shape $[[U'']]_{n+M}$ 325 is transmitted to the service provider 310 and may be externally observable when transmitted on an unsecure or unencrypted channel. At the service provider 310, or model owner, a second transformation occurs. The transformation $\beta^{-1}\pi$ 330 is performed to produce $[[U']]_{n+N}$ 335 for the camouflaged model 340. The transformation $\beta^{-1}\pi$ 330 reverses or inverts the first transformation 320, but applies a second transformation π that is not visible to both legitimate clients 305 and external observers outside the service provider 310. An unethical client may attempt to reverse engineer the mapping from U to U", but the unethical client does not know the transformation $\beta^{-1}\pi$ 330, which is concealed entirely within the model owner's control. Thus to the client, input $[[U]]_n$ 315 is known and the first transformation may be reverse engineered, but the second transformation $\beta^{-1}\pi$ 330 is hidden and cannot be reverse engineered as altered input $[[U']]_{n+N}$ 335, the result of the second transformation, is not visible, nor is it possible to reverse engineer it as it is then processed by the camouflage model 340.

Similar transformations occur to reach the usable output $\{V\}_k$ 370. The camouflage model produces the output $\{V'\}_{k+K}$ 345, which is transformed by the server side hidden transformation $\phi\theta^{-1}$ 350. The transformation $\phi\theta^{-1}$ 350 applies the transformation φ to the output to remove the distortion based on the camouflage model 340. Transformation $\phi\theta^{-1}$ 350 applies the transformation $\theta^{-1}$ for transmission to the client, wherein transformation $\theta^{-1}$ is the inverse of the output transformation, which will be applied at the specific client. Transformation $\phi\theta^{-1}$ 350 transforms the output to $\{V''\}_{k+J}$ 360, which is externally visible, while the output of the camouflage model, output $\{V'\}_{k+K}$ 345, is never visible outside the service provider 310. The mapping into the externally observable output $\{V''\}_{k+J}$ 360 does not allow the client 305 to know what happened inside the server side proxy container that hides the camouflage model, which produced an output $\{V'\}_{k+K}$ 345. The client may use transformation θ 365 to transform output $\{V''\}_{k+J}$ 360 to $\{V\}_k$ 370 for use by the client 305. Thus, while $\{V''\}_{k+J}$ 360 may be externally observable, the data is useless without the transformation θ 365. This scheme may protect a client from the external observers, which cannot recover $[[U]]_n$ 315 or $\{V\}_k$ 370 from watching v and $\{V''\}_{k+J}$ 360.

Figure 4:
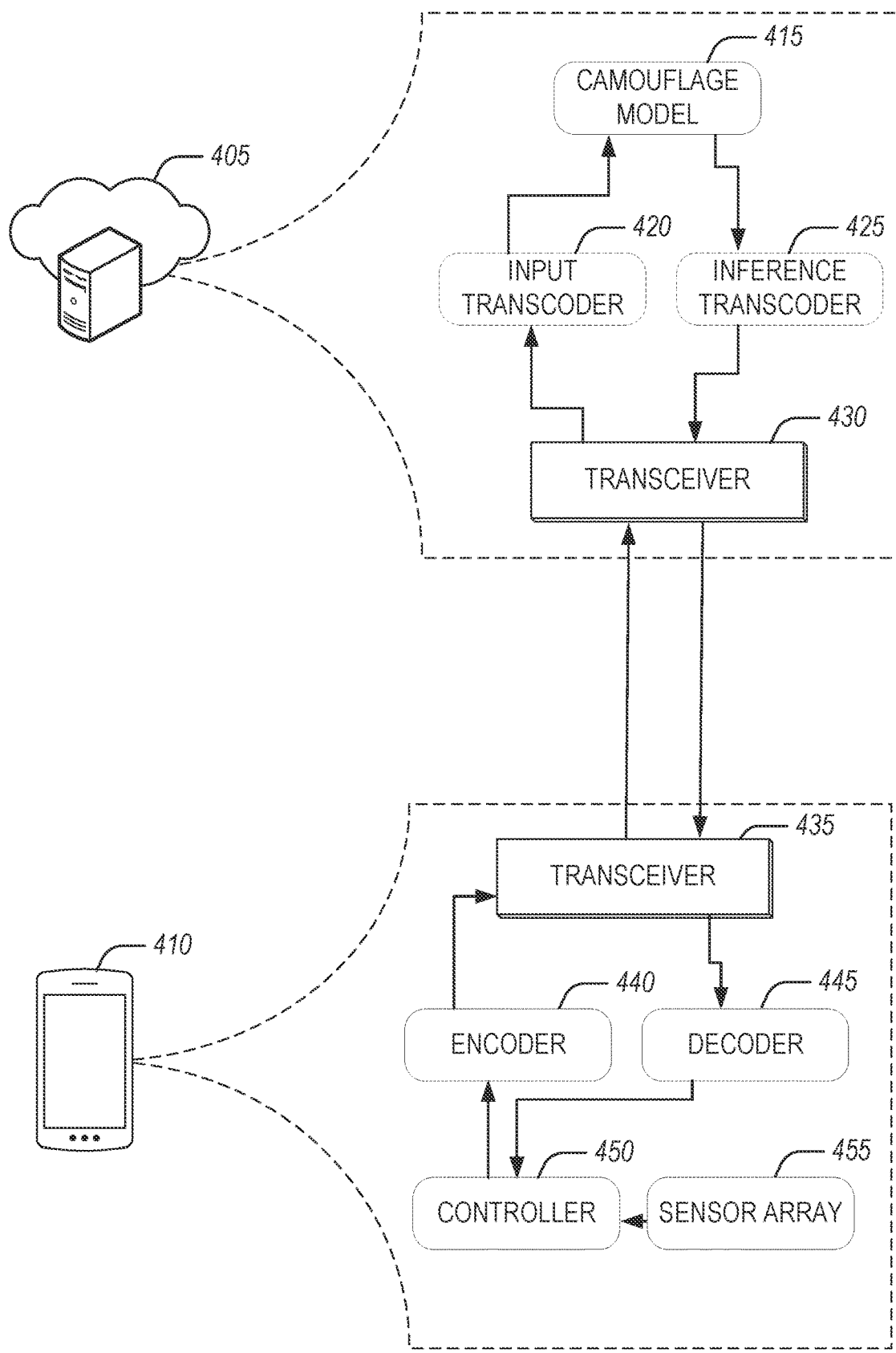
FIG. 4 illustrates a client and server systems for interfacing with a camouflaged neural network, in accordance with some embodiments.

FIG. 4 illustrates the client 410 and server 405 systems for interfacing with a camouflaged neural network, in accordance with some embodiments. In an embodiment, the client device 410 may have a client application for collecting data, encoding the data, and transmitting it to an AI model on server 405. The client application may include a controller 450 to collect data for the training or inferencing with the AI model. The controller 450 may receive data from a sensor array 455. The sensor array 455 may be connected to one or more sensors. The sensor array 455 provides a central point for the controller 450 or other device components to connect through to receive sensor data. The controller 450 may send the data, such as sensor data received from the sensor array 455, to the encoder 440. The encoder 440 performs the transformation to the data. As described above, the transformation may include rotations, scaling, noise, and the addition of false values. After performing the transformation to the data at the encoder 440, the transformed data is sent to the transceiver 435 to be transmitted to the server 405. As previously discussed, the issue of establishing a secure channel is removed by transforming the data.

The transformed data may be received at the transceiver 430 of the server 405. The received transformed data may be sent directly to the camouflaged model 415 for training or inference. Alternatively, the received transformed data may be sent to an input transcoder 420, which includes encoding and decoding, to transform the data a second time to further hide the camouflage model 415 from the client 410. The input transcoder 420 may include a transformation to decode the transformation performed by the encoder 440 at the client 410. The input transcoder 420 may then send the second transformed data to the camouflaged model 415. The camouflaged model 415, trained on transformed data, may produce an output of transformed data. The transformed data from the camouflaged model 415 may be sent to the transceiver 430 for transmission to the client 410. Alternatively, the camouflaged model 415 may send the transformed output data to the inference transcoder 425, which included encoding and decoding. The inference transcoder 425 may decode the transformed output data based on the transformation inherent in the camouflaged model 415. The inference transcoder 425 may include a transformation to encode the output data corresponding to a decode transformation performed at the client 410. The inference transcoder 425 may send the output data to the transceiver 430 to be transmitted to the client 410.

The transceiver 435 at the client 410 may receive the transformed output data from the server 405. The received output data is sent to a decoder 445 to transform the data to useable data. The useable data is sent to the controller 450 to then be directed to the processor or other component of the client 410 for use.

Figure 5:
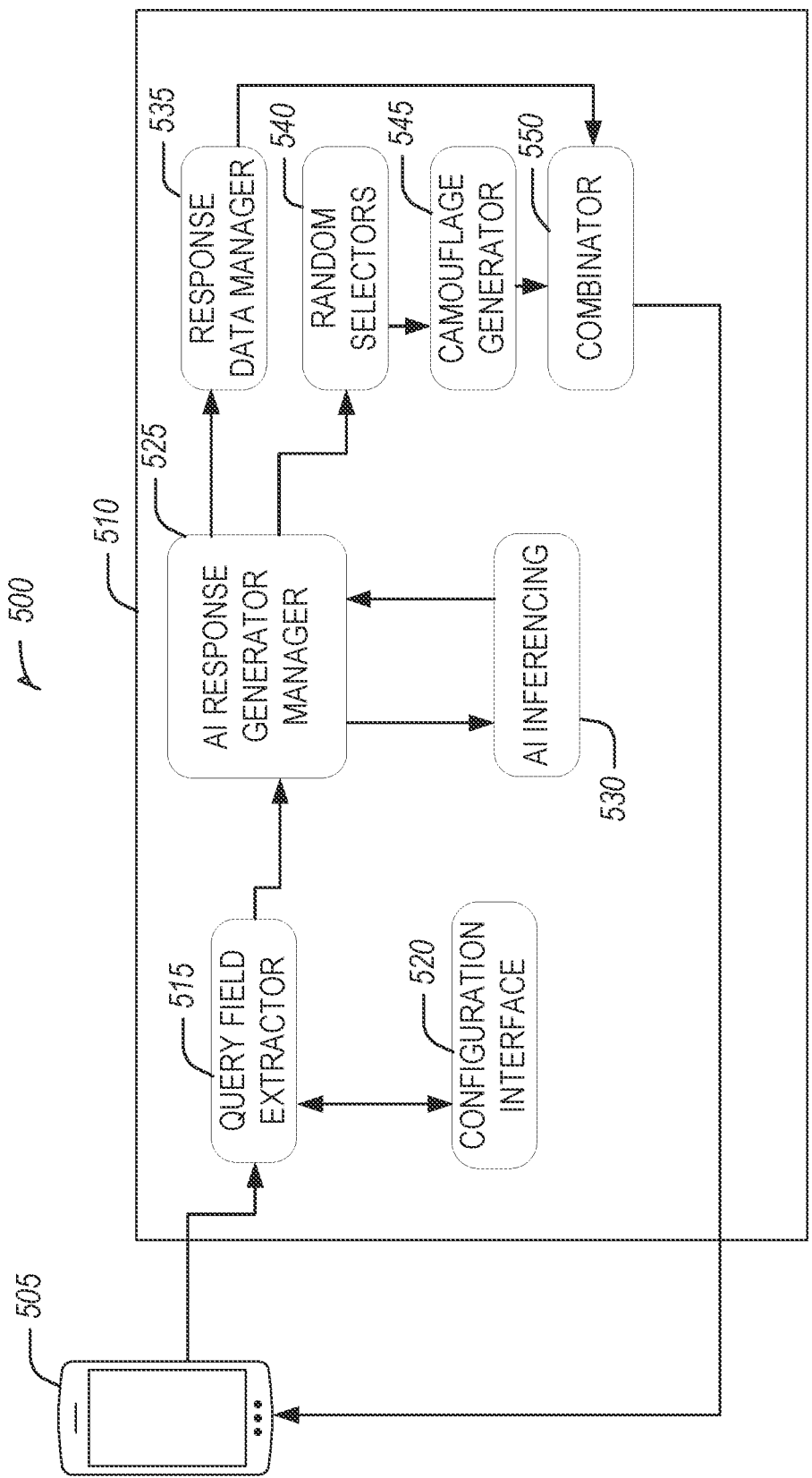
FIG. 5 illustrates an example of a system for querying or inferencing a camouflaged model, in accordance with some embodiments.

FIG. 5 illustrates an example of a system 500 for querying or inferencing a camouflaged model, in accordance with some embodiments. In the example system 500, a client device 505, such as a smartphone, may transmit a query or inference request to the server-side system where the camouflaged model resides. When a query is received at the server 510, the query field extractor 515 may extract the query from the client device 505 based on the transformations performed at the client device 505, such as by an application on the client device 505. The client device 505 or the application may have a unique identifier that is provided with the query, such that the query field extractor 515 may perform a specific reverse transformation to extract the query based on the unique identifier. The query field extractor 515 may interface with the configuration interface 520 to look up the transformation or reverse transformation to perform for extracting the query. The server 510 may include multiple camouflaged models. Factors such as the type of query, the subject matter of the query, or the unique identifier provided, may determine which camouflaged model the query is directed to. The configuration interface 520 may be referenced to determine the appropriate model for the received query. Based on the determined model for the query, the configuration interface 520 may provide instruction for a specific transformation to be applied to the query.

The query is sent to the AI response generator manager 525 to direct the query to the determined camouflage model for AI inferencing 530. The AI response generator manager 525 manages the inference requests to AI inferencing 530 and the inference responses from AI inferencing 530. The AI response generator manager 525 sends the inference response to the response data manager 535. The response data manager may collect additional information such as the unique identifier for the client device 505 or application to determine where to direct the inference response data. The AI response generator manager 525 may send direction to a random selector manager 540 to determine and generate the possible placement and distribution of random values to include in the response to the client device 505. The unique identifiers and particular camouflage model may determine the distribution and placement of the random values. The camouflage generator 545 may determine the transformations and reverse transformation, which may be applied to the inference response data. Similarly, factors such as the client device 505, the application, and the inference model may determine the camouflage transformations to apply. At the combinator 550, the random values, inference response data, and camouflage transformations are combined and applied to generate the camouflaged response for transmission to the client device 505.

The described system and methods allow having AI models on the edge such that any outside observation of the training and inferencing data may not be able to derive how the model works and what part of the data used is valid. Thus, for parties using a client of a service provider, which have not established prior trust with the service provider, the service provider may share infrastructure without concern that the intellectual secrets of the model and neural network will be stolen. Another concern may exist if the model owner is different than the edge cloud provider, and thus the model owner is providing the edge cloud provider with access to the model. For example, the model may be uploaded into the edge cloud provider infrastructure. However, the model is guarded from the edge cloud provider, as the owner of the model may protect the server-side transformations and thus hides even to someone using the model, how the inputs are transformed (camouflaged) and how to recover the transformed (camouflaged) actual outputs. While the described systems and methods are exemplified in the context of edge cloud, usage may also apply in any type of fog or IoT architecture using AI as part of its solution stack.

The described systems and methods may extend the architecture of the IoT or Edge devices connected to a data center running AI training and inferencing. Connected devices are configured, such as with an application on the device, to send training data or query for an inferencing request for a particular model by adding random data to pre-established variables, which may only be known by the devices and device managers.

A device may be configured by a trusted device manager. The trusted device manager configures the device with response variables and predictive variables for the transformations, based on a particular model identification. Herein predictive variables refer to the results that the camouflaged model may be trained to produce by virtue of prior training. These results variables may be the distorted output that the camouflaged model may produce, given that it was trained by the model creator (trainer) with distortions of that actual output, which would have trained a traditional (uncamouflaged) model. The input and output data may be set of variables. The variables may be a configured in a specific order based on the particular model. The order of variables includes variables for real data and variables for fake data. The configuration, based on the particular model, specifies the appropriate order for the model such that the device places the real data in the ordered variable spots the model is anticipating for real data. The fake data may be randomly generated data based on a distribution. The fake data variables may vary in data type used. For example, the fake data variables may be chosen from a set of data types, such as integer, float, datetime, or text.

The response variables may be used as part of the training data and the data returned by an inferencing request in the inferencing, when the device receives the response from the edge appliance for a particular inferencing request, the configured logic based on the identified model may filter the variables and thus provide to the device the real data. In the training, when the device sends a set of real data (e.g., sensor data) to the edge for applying the training, the configured logic may add random data in accordance with the configuration for the identified model.

The predictive variables may be used as part of the training data and sent with an inferencing request. In the case of inferencing, when the device makes an inference request based on a set of predictive variables, random data may be added to each of the fake variables. In the case of training, when the device sends training data based on a set of predictive variables, random data may be added to each of the fake variables.

A table may be stored in the client device, such as part of an application. A table may be stored at a server or datacenter associated with the camouflaged models, with the table corresponding to a device identified by a unique identifier associated with the client device. The service provider may have multiple camouflaged models with each camouflaged model associated with a group of client devices. A table may identify the camouflaged model the client device or application it is associated with. The table may identify the position of the predictive or response variables for the datatype that is associated with each position, and if the position is designated for real data or false data. The false data may be randomly generated based on the data type and a specified distribution. Other factors may be used to alternate the positions of real and false data. For example, based on the time of day, the position order may change. A table may be used to designate the positions for a time of day for a set of identifiers. For example, a client device identified as ABC has an associated table that specifies that between midnight and noon, the real data is in positions 2 and 3 of an input vector, but between noon and midnight, the real data is in positions 4 and 5 of an input vector.

Figure 6:
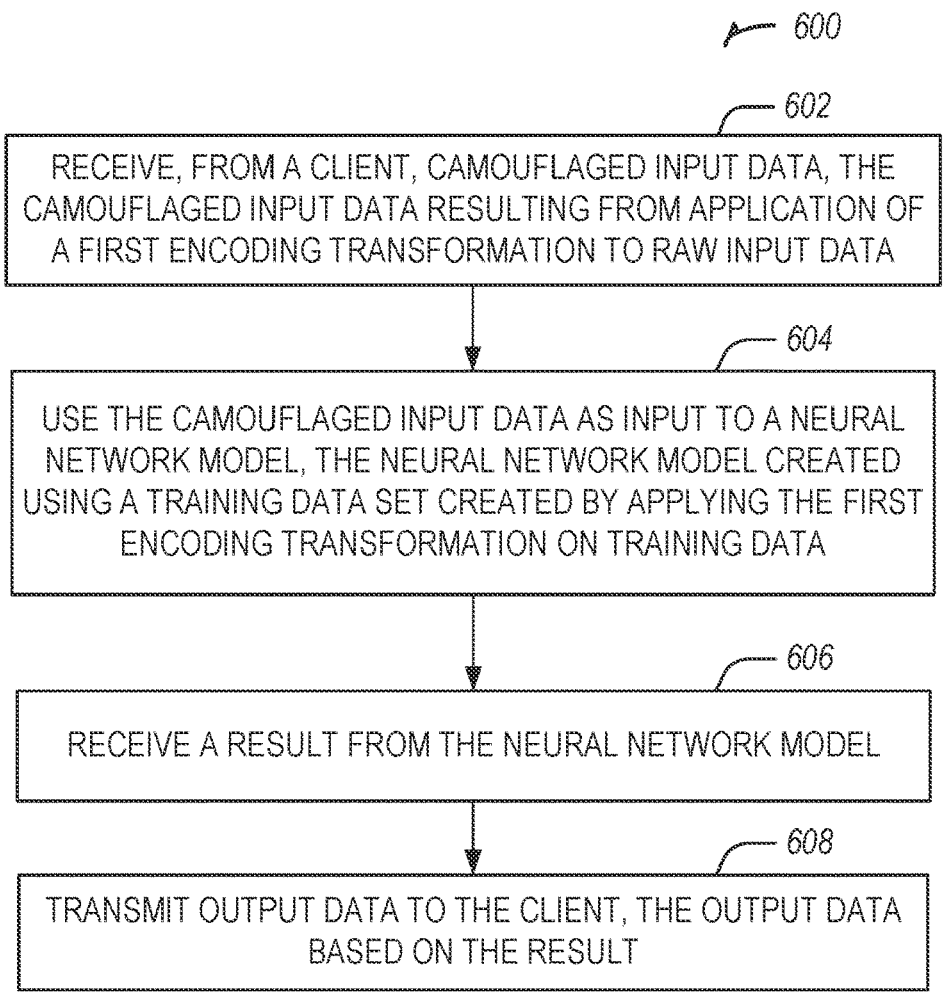
FIG. 6 illustrates a flowchart showing a technique for training and inferencing with a camouflaged neural network model in accordance with some embodiments.

FIG. 6 illustrates a flowchart showing a technique 600 for training and inferencing with a camouflaged neural network model in accordance with some embodiments. The technique 600 includes an operation 602 to receive, from a client, camouflaged input data, the camouflaged input data resulting from application of a first encoding transformation to raw input data. The client may be a computing device, such as a smartphone or smartwatch, which may have sensors or other components for capturing data. The client may be a computing device, which is part of an apparatus, such as a vehicle with an onboard computer. The raw input data may be data collected from the sensors or components of the computing device. For example, the data may be generated from an accelerometer or gyroscope providing data about the movement of the sensors. The data may be generated from a camera collecting images from around the computing device or apparatus.

The client may perform a first encoding transformation on the raw data to derive the camouflaged data for transmission to the neural network model. The raw input data may be captured into a vector of ordered values, with each position of the ordered values designated for actual raw input data or false data. For example, the raw input data may be sets of two dimensional values, but instead each two-dimensional value is part of a five value vector, with the other three values being false data. The order of the actual raw input data values in the vector may differ from the order in the raw input data form. The false data may be interspersed among the raw data values in the vector. The false data may be a randomly generated value from a distribution. Each position of the ordered values designated for false data may be a randomly selected data type. For example, the false data may vary the data types used, such as selecting data types from among an integer, float, datetime, or text data type. The first encoding transformation may include scaling and rotation of the raw input data.

The technique 600 may further include deriving a second camouflaged input data by applying a second encoding transformation to the camouflaged input data, after the camouflaged input data has been transmitted to the location of the neural network model (but before being input to the camouflaged neural network model). The second encoding transformation may include multiple transformation steps, such as reversing the previous transformations and performing transformations to put the input data into a state for interfacing with the camouflaged neural network. The second encoding transformation may include a decoding transformation corresponding to the first encoding transformation, such that the decoding transformation performs a reverse or inverse transformation of the first encoding transformation. The second encoding transformation may include scaling and rotation of the camouflaged input data. The second encoding transformation may be an operation hidden to the client to transform the input data into the distorted or camouflaged state appropriate for how the camouflaged neural network was trained.

The technique 600 may further include receiving, from the client, a client identifier. The client identifier may identify the client device, the user of the client device, or an application on the client device, which applied the first encoding transformation to the raw input data. The technique 600 may further include selecting a neural network model from a plurality of neural network models based on the client identifier. The transformations that comprise the second encoding transformation may be determined from the client identifier to identify the client, the application on the client, and a specific camouflaged neural network model.

The technique 600 may further include an operation 604, to use the camouflaged input data as input to a neural network model, the neural network model, or camouflaged neural network model, created using a training data set created by applying the first encoding transformation on training data. The technique 600 may further include an operation 606, to receive a result from the neural network model.

The technique 600 may further include an operation 608, to transmit output data to the client, the output data being based on the result. For example, the input data may be part of an inference request to the neural network model anti the output data may be a response to the inference request by the neural network model.

For example, the output data may be in a format for the client to transform to usable data by performing a transformation at the client. Here, the output data may be a form of distorted output data such that the client applies a de-distortion transformation to convert the output data to raw output data. The de-distortion transformation may be associated with the camouflaged neural network model.

The result may be camouflaged output data as an effect of the neural network model, or camouflaged neural network model, created using the training data set created by applying the first encoding transformation on training data. The output data may be a vector of ordered values that incorporates the result of the camouflaged neural network into the vector. Here, each position of the ordered values of the vector may be designated for actual data or false data. The output data may be a vector of ordered values, with each position of the ordered values designated for actual data or false data. For example, the result may be sets of two dimensional values, but instead each two-dimensional value is incorporated into a five value vector, with the other three values being false data. The order of the result values in the vector may differ from the order the result values. The false data may be interspersed among the result values in the vector. The false data may be a randomly generated value from a distribution. Each position of the ordered values designated for false data is a randomly selected data type. For example, the false data may vary the data types used, such as selecting data types from among an integer, float, datetime, or text data type.

The technique 600 may further include an operation to derive output data by applying an encoding transformation to the result before transmitting to the client. The encoding transformation may include scaling and rotation of the result. The encoding transformation may include multiple transformation steps, such as reversing the distortion from the camouflaged neural network and performing transformations corresponding to a transformation performed at the client to extract useable data from the output data. The encoding transformation may include a decoding transformation corresponding to the camouflaged neural network, such that the decoding transformation performs a reverse or inverse transformation based on the inherent transformation of the camouflaged neural network model. The encoding transformation may be an operation hidden to the client to transform the result into the distorted or camouflaged state appropriate for receipt by the client and distorted or camouflaged for safe transmittal on an unsecure channel.

Figure 7:
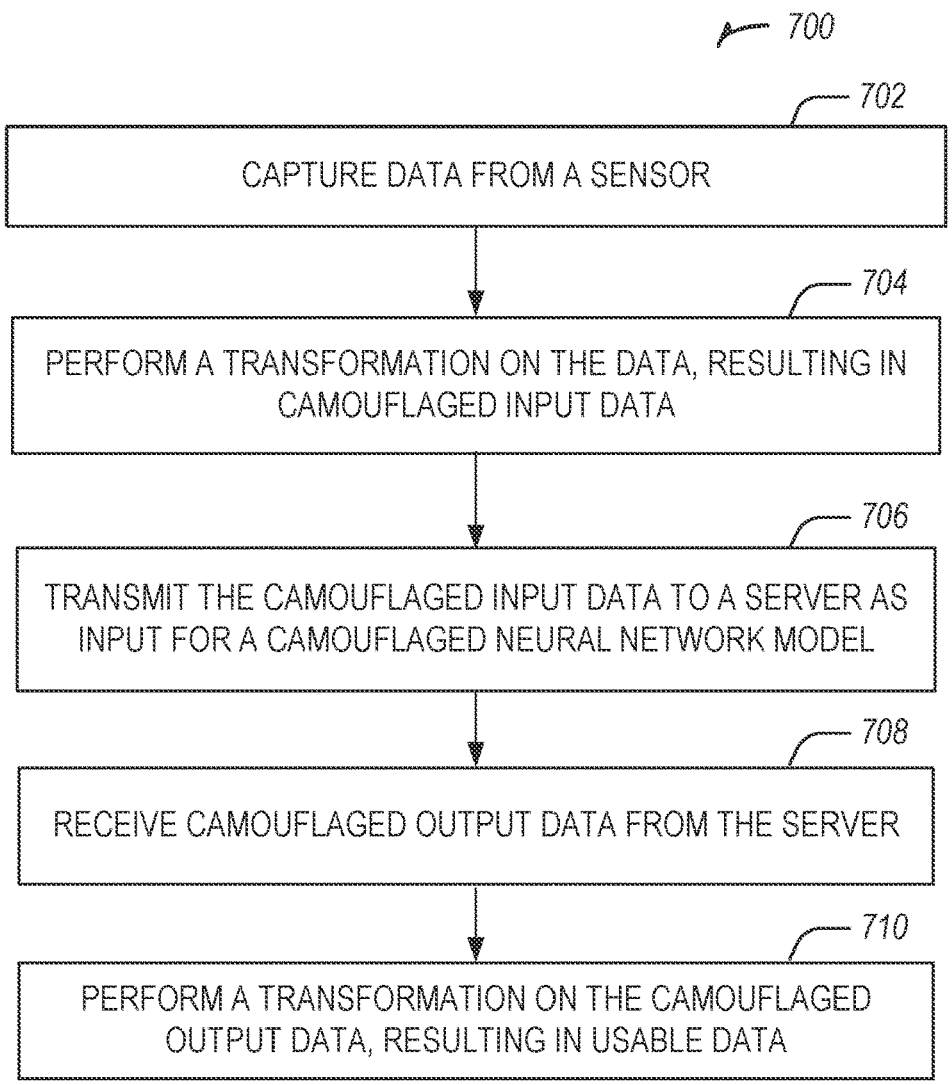
FIG. 7 illustrates a flowchart showing a technique for a client interfacing with a camouflaged neural network model in accordance with some embodiments.

FIG. 7 illustrates a flowchart showing a technique 700 for a client interfacing with a camouflaged neural network model in accordance with some embodiments. The technique 700 includes an operation 702 to capture data from sensor. For example, the client may be a smartphone which includes sensors such as a camera, microphone, accelerometer, and gyroscope. An application on the smartphone may capture and collect data from these sensors. The collected data may be used to train a neural network or may be used to inference a result from the neural network, such as inferencing a person may be in danger based on the movements of the smartphone. Another example may be a vehicle with an onboard driver assistance system which captures data from sensors on the vehicle.

The technique 700 may include an operation 704 to perform a transformation on the data, resulting in camouflaged input data. The transformation may allow for the data to be transmitted on an unsecure channel. The technique 700 may include an operation 706 to transmit the camouflaged input data to a server as input for a camouflaged neural network model. For example, a client device may transmit the camouflaged input data to a server for training or inferencing. The server receiving the camouflaged data may store the camouflaged neural network model or may transmit the data to another server or device with the camouflaged neural network. At the server, the camouflaged input data may be transformed. Transformation may include reversing the transformation performed at operation 704 and performing transformation based on the transformations used to train the camouflaged neural network.

The technique 700 may include an operation 708 to receive camouflaged output data from the server. For example, the camouflaged neural network model may produce a result based on the camouflaged input data. The result may be transformed at the server to allow transmission to the client device on an unsecured channel. The transformation performed at the server may be based on the known transformations stored at the client device, such as the application on the client device. The technique 700 may include operation 710 to perform a transformation on the camouflaged output data, resulting in usable data. For example, an application on the client device may receive the camouflaged output data and perform a transformation to reverse the transformation performed at the server. The result may be data in a form for the application to utilize, such as providing information to the user of the client device based on the captured sensor data.

Figure 8:
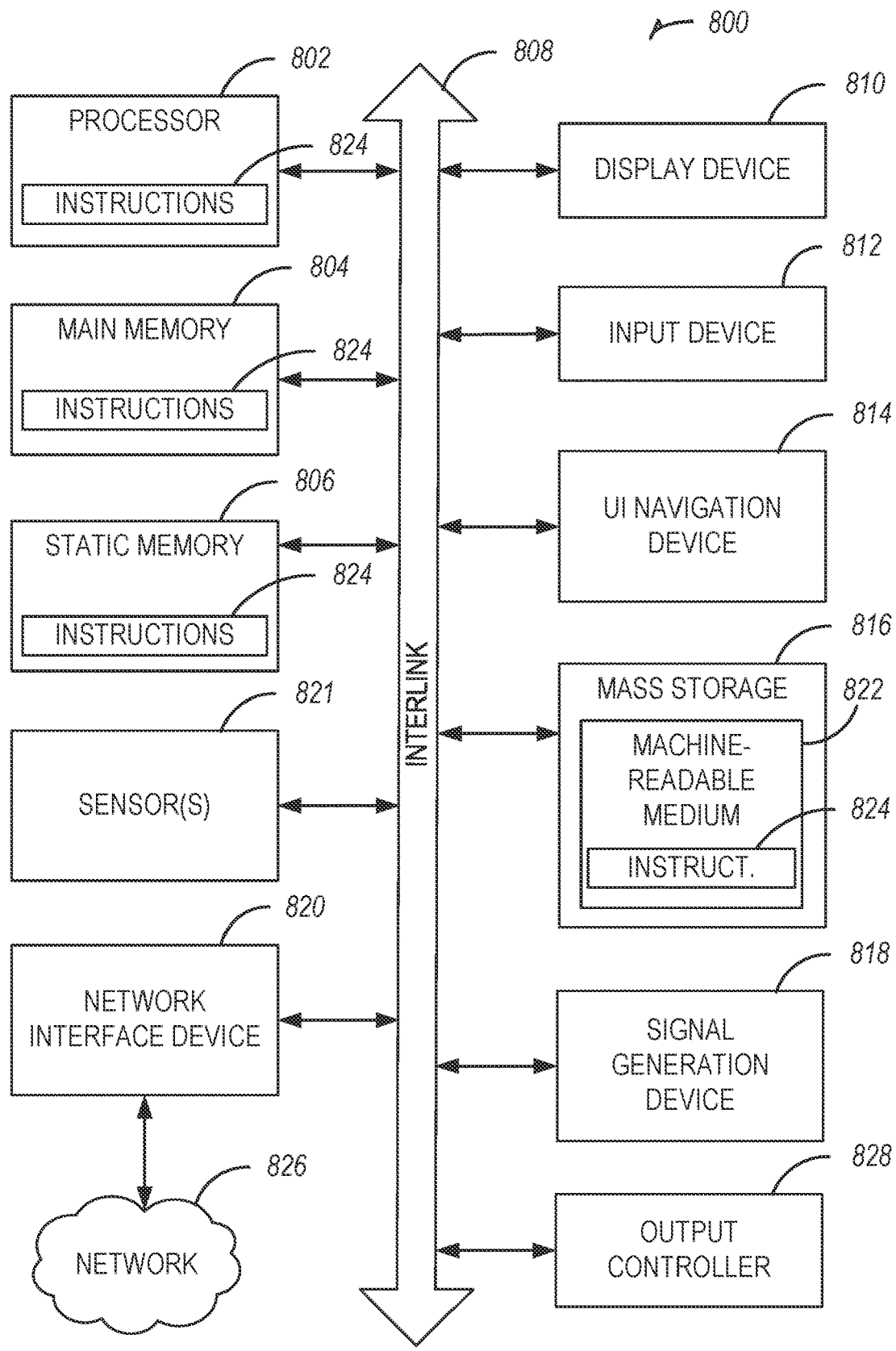
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, field programmable gate array (FPGA), or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (UPS) sensor, compass, accelerometer, or other sensor. The machine 800 may include an output controller 828, such as a serial e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or used by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES & EXAMPLES

Example 1 is a system for camouflaging data in a cloud computing environment, comprising: at least one processor; and memory including instructions that, when executed by the at least one processor, cause the at least one processor to: receive, from a client, camouflaged input data, the camouflaged input data resulting from application of a first encoding transformation to raw input data; use the camouflaged input data as input to a neural network model, the neural network model created using a training data set created by applying the first encoding transformation on training data; receive a result from the neural network model; and transmit output data to the client, the output data based on the result.

In Example 2, the subject matter of Example 1 includes, wherein the output data is in a format for the client to transform to usable data.

In Example 3, the subject matter of Examples 1-2 includes, wherein the input data is part of an inference request to the neural network model and the output data is a response to the inference request by the neural network model.

In Example 4, the subject matter of Examples 1-3 includes, instructions to: derive a second camouflaged input data by applying a second encoding transformation to the camouflaged input data.

In Example 5, the subject matter of Example 4 includes, wherein applying the second encoding transformation includes applying a decoding transformation corresponding to the first encoding transformation.

In Example 6, the subject matter of Examples 4-5 includes, wherein applying the second encoding transformation includes scaling and rotating of the camouflaged input data.

In Example 7, the subject matter of Examples 1-6 includes, wherein the output data is a form of distorted output data such that the client applies a de-distortion transformation to convert the output data to raw output data.

In Example 8, the subject matter of Examples 1-7 includes, wherein the result is camouflaged output data as an effect of the neural network model created using the training data set created by applying the first encoding transformation on training data.

In Example 9, the subject matter of Example 8 includes, instructions to: derive the output data by applying a second encoding transformation to the result from the neural network model.

In Example 10, the subject matter of Example 9 includes, wherein deriving the output data includes applying a second decoding transformation to the result to produce an intermediate result, the intermediate result then used as input to the second encoding transformation to produce the output data.

In Example 11, the subject matter of Examples 1-10 includes, wherein the input data is a vector of ordered values, with each position of the ordered values designated for actual data or false data.

In Example 12, the subject matter of Example 11 includes, wherein the false data is a randomly generated value from a distribution.

In Example 13, the subject matter of Examples 11-12 includes, wherein each position of the ordered values designated for false data is a randomly selected data type.

In Example 14, the subject matter of Examples 1-13 includes, wherein the output data is a vector of ordered values, with each position of the ordered values designated for actual data or false data.

In Example 15, the subject matter of Example 14 includes, wherein the false data is a randomly generated value from a distribution.

In Example 16, the subject matter of Examples 14-15 includes, wherein each position of the ordered values designated for false data is a randomly selected data type.

In Example 17, the subject matter of Examples 1-16 includes, wherein the first encoding transformation includes scaling and rotating the raw input data.

In Example 18, the subject matter of Examples 1-17 includes, instructions to: receive, from the client, a client identifier; and select the neural network mod& from a plurality of neural network models based on the client identifier.

In Example 19, the subject matter of Example 18 includes, instructions to: perform a query-using the client identifier to a table associating client identifiers and client-side encoding transformations; identify from the query the client-side encoding transformation associated with the client identifier; perform an inverse transformation to the camouflaged input data based on the identified client-side encoding transformation.

Example 20 is at least one computer readable medium including instructions for camouflaging data in a cloud computing environment that when executed by at least one processor, cause the at least one processor to: receive, from a client, camouflaged input data, the camouflaged input data resulting from application of a first encoding transformation to raw input data; use the camouflaged input data as input to a neural network model, the neural network model created using a training data set created by applying the first encoding transformation on training data; receive a result from the neural network model; and transmit output data to the client, the output data based on the result.

In Example 21, the subject matter of Example 20 includes, wherein the output data is in a format for the client to transform to usable data.

In Example 22, the subject matter of Examples 20-21 includes, wherein the input data is part of art inference request to the neural network model and the output data is a response to the inference request by the neural network model.

In Example 23, the subject matter of Examples 20-22 includes, instructions to: derive a second camouflaged input data by applying a second encoding transformation to the camouflaged input data.

In Example 24, the subject matter of Example 23 includes, wherein applying the second encoding transformation includes applying a decoding transformation corresponding to the first encoding transformation.

In Example 25, the subject matter of Examples 23-24 includes, wherein applying the second encoding transformation includes scaling and rotating of the camouflaged input data.

In Example 26, the subject matter of Examples 20-25 includes, wherein the output data is a form of distorted output data such that the client applies a de-distortion transformation to convert the output data to raw output data.

In Example 27, the subject matter of Examples 20-26 includes, wherein the result is camouflaged output data as an effect of the neural network model created using the training data set created by applying the first encoding transformation on training data.

In Example 28, the subject matter of Example 27 includes, instructions to: derive the output data by applying a second encoding transformation to the result from the neural network model.

In Example 29, the subject matter of Example 28 includes, wherein deriving the output data includes applying a second decoding transformation to the result to produce an intermediate result, the intermediate result then used as input to the second encoding transformation to produce the output data.

In Example 30, the subject matter of Examples 20-29 includes, wherein the input data is a vector of ordered values, with each position of the ordered values designated for actual data or false data.

In Example 31, the subject matter of Example 30 includes, wherein the false data is a randomly generated value from a distribution.

In Example 32, the subject matter of Examples 30-31 includes, wherein each position of the ordered values designated for false data is a randomly selected data type.

In Example 33, the subject matter of Examples 20-32 includes, wherein the output data is a vector of ordered values, with each position of the ordered values designated for actual data or false data.

In Example 34, the subject matter of Example 33 includes, wherein the false data is a randomly generated value from a distribution.

In Example 35, the subject matter of Examples 33-34 includes, wherein each position of the ordered values designated for false data is a randomly selected data type.

In Example 36, the subject matter of Examples 20-35 includes, wherein the first encoding transformation includes scaling and rotating the raw input data.

In Example 37, the subject matter of Examples 20-36 includes, instructions to: receive, from the client, a client identifier; and select the neural network model from a plurality of neural network models based on the client identifier.

In Example 38, the subject matter of Example 37 includes, instructions to: perform a query using the client identifier to a table associating client identifiers and client-side encoding transformations; identify from the query the client-side encoding transformation associated with the client identifier; perform an inverse transformation to the camouflaged input data based on the identified client-side encoding transformation.

Example 39 is a method for camouflaging data in a cloud computing environment, comprising: receiving, from a client, camouflaged input data, the camouflaged input data resulting from application of a first encoding transformation to raw input data; using the camouflaged input data as input to a neural network model, the neural network model created using a training data set created by applying the first encoding transformation on training data; receiving a result from the neural network model; and transmitting output data to the client, the output data based on the result.

In Example 40, the subject matter of Example 39 includes, wherein the output data is in a format for the client to transform to usable data.

In Example 41, the subject matter of Examples 39-40 includes, wherein the input data is part of an inference request to the neural network model and the output data is a response to the inference request by the neural network model.

In Example 42, the subject matter of Examples 39-41 includes, deriving a second camouflaged input data by applying a second encoding transformation to the camouflaged input data.

In Example 43, the subject matter of Example 42 includes, wherein applying the second encoding transformation includes applying a decoding transformation corresponding to the first encoding transformation.

In Example 44, the subject matter of Examples 42-43 includes, wherein applying the second encoding transformation includes scaling and rotating of the camouflaged input data.

In Example 45, the subject matter of Examples 39-44 includes, wherein the output data is a form of distorted output data such that the client applies a de-distortion transformation to convert the output data to raw output data.

In Example 46, the subject matter of Examples 39-45 includes, wherein the result is camouflaged output data as an effect of the neural network model created using the training data set created by applying the first encoding transformation on training data.

In Example 47, the subject matter of Example 46 includes, deriving the output data by applying a second encoding transformation to the result from the neural network model.

In Example 48, the subject matter of Example 47 includes, wherein deriving the output data includes applying a second decoding transformation to the result to produce an intermediate result, the intermediate result then used as input to the second encoding transformation to produce the output data.

In Example 49, the subject matter of Examples 39-48 includes, wherein the input data is a vector of ordered values, with each position of the ordered values designated for actual data or false data.

In Example 50, the subject matter of Example 49 includes, wherein the false data is a randomly generated value from a distribution.

In Example 51, the subject matter of Examples 49-50 includes, wherein each position of the ordered values designated for false data is a randomly selected data type.

In Example 52, the subject matter of Examples 39-51 includes, wherein the output data is a vector of ordered values, with each position of the ordered values designated for actual data or false data.

In Example 53, the subject matter of Example 52 includes, wherein the false data is a randomly generated value from a distribution.

In Example 54, the subject matter of Examples 52-53 includes, wherein each position of the ordered values designated for false data is a randomly selected data type.

In Example 55, the subject matter of Examples 39-54 includes, wherein the first encoding transformation includes scaling and rotating the raw input data.

In Example 56, the subject matter of Examples 39-55 includes, receiving, from the client, a client identifier; and selecting the neural network model from a plurality of neural network models based on the client identifier.

In Example 57, the subject matter of Example 56 includes, performing a query using the client identifier to a table associating client identifiers and client-side encoding transformations; identifying from the query the client-side encoding transformation associated with the client identifier; performing an inverse transformation to the camouflaged input data based on the identified client-side encoding transformation.

Example 58 is a system for camouflaging data in a cloud computing environment, the system comprising: means for receiving, from a client, camouflaged input data, the camouflaged input data resulting from application of a first encoding transformation to raw input data; means for using the camouflaged input data as input to a neural network model, the neural network model created using a training data set created by applying the first encoding transformation on training data; means for receiving a result from the neural network model; and means for transmitting output data to the client, the output data based on the result.

In Example 59, the subject matter of Example 58 includes, wherein the output data is in a format for the client to transform to usable data.

In Example 60, the subject matter of Examples 58-59 includes, wherein the input data is part of an inference request to the neural network model and the output data is a response to the inference request by the neural network model.

In Example 61, the subject matter of Examples 58-60 includes, means for deriving a second camouflaged input data by applying a second encoding transformation to the camouflaged input data.

In Example 62, the subject matter of Example 61 includes, wherein applying the second encoding transformation includes applying a decoding transformation corresponding to the first encoding transformation.

In Example 63, the subject matter of Examples 61-62 includes, wherein applying the second encoding transformation includes scaling and rotating of the camouflaged input data.

In Example 64, the subject matter of Examples 58-63 includes, wherein the output data is a form of distorted output data such that the client applies a de-distortion transformation to convert the output data to raw output data.

In Example 65, the subject matter of Examples 58-64 includes, wherein the result is camouflaged output data as an effect of the neural network model created using the training data set created by applying the first encoding transformation on training data.

In Example 66, the subject matter of Example 65 includes, means for deriving the output data by applying a second encoding transformation to the result from the neural network model.

In Example 67, the subject matter of Example 66 includes, wherein deriving the output data includes applying a second decoding transformation to the result to produce an intermediate result, the intermediate result then used as input to the second encoding transformation to produce the output data.

In Example 68, the subject matter of Examples 58-67 includes, wherein the input data is a vector of ordered values, with each position of the ordered values designated for actual data or false data.

In Example 69, the subject matter of Example 68 includes, wherein the false data is a randomly generated value from a distribution.

In Example 70, the subject matter of Examples 68-69 includes, wherein each position of the ordered values designated for false data is a randomly selected data type.

In Example 71, the subject matter of Examples 58-70 includes, wherein the output data is a vector of ordered values, with each position of the ordered values designated for actual data or false data.

In Example 72, the subject matter of Example 71 includes, wherein the false data is a randomly generated value from a distribution.

In Example 73, the subject matter of Examples 71-72 includes, wherein each position of the ordered values designated for false data is a randomly selected data type.

In Example 74, the subject matter of Examples 58-73 includes, wherein the first encoding transformation includes scaling and rotating the raw input data.

In Example 75, the subject matter of Examples 58-74 includes, means for receiving, from the client, a client identifier; and means for selecting the neural network model from a plurality of neural network models based on the client identifier.

In Example 76, the subject matter of Example 75 includes, means for performing a query using the client identifier to a table associating client identifiers and client-side encoding transformations; means for identifying from the query the client-side encoding transformation associated with the client identifier; means for performing an inverse transformation to the camouflaged input, data based on the identified client-side encoding transformation.

Example 77 is at least one machine-readable medium including instructions that, when executed by processing circuitry, cause the processing circuitry to perform operations to implement of any of Examples 1-76.

Example 78 is an apparatus comprising means to implement of any of Examples 1-76.

Example 79 is a system to implement of any of Examples 1-76.

Example 80 is a method to implement of any of Examples 1-76.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A server device for processing a neural network model in an edge computing environment, comprising:
a processor; and
memory including instructions, which when executed by the processor, cause the server device to:
receive, from a connected device in the edge computing environment, a neural network processing request, the neural network processing request including a client-specific unique identifier associated with the connected device and an inference request, wherein the inference request is distorted using a client transformation;
select a neural network model based on the inference request received from the connected device;
provide the inference request as input to the selected neural network model, the neural network model trained on distorted input data and configured to produce distorted output data;
receive the distorted output data from the neural network model for use as inference response data; and
transmit the inference response data for use by the connected device, the connected device to undistort the distorted output data.

2. The server device of claim 1, wherein the client-specific unique identifier is a device identifier.

3. The server device of claim 1, wherein the client-specific unique identifier is an application identifier.

4. The server device of claim 1, wherein the client transformation transforms raw input data using at least one operation including: rotation, scaling, noise, or addition of false values.

5. The server device of claim 1, wherein the inference request includes a type of request, which is used by the server device to select the selected neural network model.

6. The server device of claim 1, wherein the inference request includes a subject matter of the inference request, which is used by the server device to select the selected neural network model.

7. The server device of claim 1, wherein the neural network model is trained on input data distorted using the client transformation.

8. The server device of claim 1, wherein the processor is configured to:
undistort the inference request received from the connected device using a reverse client transformation corresponding to the client transformation to produce an undistorted inference request, the reverse client transformation selected based on the client-specific unique identifier;
re-distort the undistorted inference request using a server transformation, for input to the neural network model;
undistort the distorted output data from the neural network model using a reverse server transformation corresponding to the server transformation, to produce undistorted output data; and
re-distort the undistorted output data using an output client transformation associated with the connected device, to produce inference response data.

9. The server device of claim 8, wherein the client transformation used by the connected device is the same as the output client transformation used by the server device.

10. The server device of claim 8, wherein the neural network model is trained on input data distorted using the server transformation.

11. At least one non-transitory computer-readable medium including instructions for using a neural network model in an edge computing environment, which when executed by one or more processors at a server device, cause the one or more processors to perform operations comprising:

receiving, from a connected device in the edge computing environment, a neural network processing request, the neural network processing request including a client-specific unique identifier associated with the connected device and an inference request, wherein the inference request is distorted using a client transformation;

selecting a neural network model based on the inference request received from the connected device;

providing the inference request as input to the selected neural network model, the neural network model trained on distorted input data and configured to produce distorted output data;

receiving the distorted output data from the neural network model for use as inference response data; and transmitting the inference response data for use by the connected device, the connected device to undistort the distorted output data.

12. The at least one non-transitory computer-readable medium of claim 11, wherein the client-specific unique identifier is a device identifier.

13. The at least one non-transitory computer-readable medium of claim 11, wherein the client-specific unique identifier is an application identifier.

14. The at least one non-transitory computer-readable medium of claim 11, wherein the client transformation transforms raw input data using at least one operation including: rotation, scaling, noise, or addition of false values.

15. The at least one non-transitory computer-readable medium of claim 11, wherein the inference request includes a type of request, which is used by the server device to select the selected neural network model.

16. The at least one non-transitory computer-readable medium of claim 11, wherein the inference request includes a subject matter of the inference request, which is used by the server device to select the selected neural network model.

17. The at least one non-transitory computer-readable medium of claim 11, wherein the neural network model is trained on input data distorted using the client transformation.

18. The at least one non-transitory computer-readable medium of claim 11, wherein the processor is configured to:
undistort the inference request received from the connected device using a reverse client transformation corresponding to the client transformation to produce an undistorted inference request, the reverse client transformation selected based on the client-specific unique identifier;
re-distort the undistorted inference request using a server transformation, for input to the neural network model;
undistort the distorted output data from the neural network model using a reverse server transformation corresponding to the server transformation, to produce undistorted output data; and
re-distort the undistorted output data using an output client transformation associated with the connected device, to produce inference response data.

19. The at least one non-transitory computer-readable medium of claim 18, wherein the client transformation used by the connected device is the same as the output client transformation used by the server device.

20. The at least one non-transitory computer-readable medium of claim 18, wherein the neural network model is trained on input data distorted using the server transformation.

21. At least one non-transitory computer-readable medium including instructions for using a neural network model in an edge computing environment, which when executed by one or more processors of a server device and a connected device, cause the one or more processors to perform operations comprising:
configuring the connected device to cause a transmission of a neural network processing request, the neural network processing request including a client-specific unique identifier associated with the connected device and an inference request, wherein the inference request is distorted using a client transformation;
configuring the server device to perform operations in response to the neural network processing request, comprising operations:
selecting a neural network model based on the inference request received from the connected device;
providing the inference request as input to the selected neural network model, the neural network model trained on distorted input data and configured to produce distorted output data;
receiving the distorted output data from the neural network model for use as inference response data; and
transmitting the inference response data for use by the connected device, the connected device to undistort the distorted output data; and
configuring the connected device to:
cause a receipt of inference response data, the inference response data distorted using the output client transformation; and
cause an undistortion of the inference response data using a reverse output client transformation corresponding to the output client transformation used by the server device.

22. The at least one non-transitory computer-readable medium of claim 21, wherein the client-specific unique identifier is a device identifier.

23. The at least one non-transitory computer-readable medium of claim 21, wherein the client-specific unique identifier is an application identifier.

24. The at least one non-transitory computer-readable medium of claim 21, wherein the client transformation transforms raw input data using at least one operation including: rotation, scaling, noise, or addition of false values.

25. The at least one non-transitory computer-readable medium of claim 21, wherein the inference request includes a type of request, which is used by the server device to select the selected neural network model.

26. The at least one non-transitory computer-readable medium of claim 21, wherein the inference request includes a subject matter of the inference request, which is used by the server device to select the selected neural network model.

27. The at least one non-transitory computer-readable medium of claim 21, wherein the neural network model is trained on input data distorted using the client transformation.

28. The at least one non-transitory computer-readable medium of claim 21, wherein the processor is configured to:
undistort the inference request received from the connected device using a reverse client transformation corresponding to the client transformation to produce an undistorted inference request, the reverse client transformation selected based on the client-specific unique identifier;

re-distort the undistorted inference request using a server transformation, for input to the neural network;

undistort the distorted output data from the neural network using a reverse server transformation corresponding to the server transformation, to produce undistorted output data; and re-distort the undistorted output data using an output client transformation associated with the connected device, to produce inference response data.

29. The at least one non-transitory computer-readable medium of claim 28, wherein the client transformation used by the connected device is the same as the output client transformation used by the server device.

30. The at least one non-transitory computer-readable medium of claim 28, wherein the neural network model is trained on input data distorted using the server transformation.

* * * * *